May 3, 1955     E. P. HARRIS ET AL     2,707,491

FLEXIBLE TUBING

Filed Aug. 17, 1951

INVENTORS
Edward P. Harris
Frederick W. Sampson

Attorneys

United States Patent Office 2,707,491
Patented May 3, 1955

2,707,491

FLEXIBLE TUBING

Edward P. Harris and Frederick W. Sampson, Dayton, Ohio, assignors to General Motors Corporation, Detroit, Mich., a corporation of Delaware Application August 17, 1951, Serial No. 242,356

3 Claims. (Cl. 138—56)

This invention relates to flexible tubing and is particularly concerned with flexible tubing formed from rubber-like material and having a high resistance toward internal bursting pressure.

It is, therefore, the basic object of the invention to provide a rubber-like tube which is highly flexible and strong and which includes means incorporated therein to improve the resistance of the tube toward internal bursting pressures.

Another object of the invention is to provide a tube which may be readily flexed without buckling at the flexed portions thereof and which includes a reinforcing wire to maintain the shape of the tube and to prevent collapse thereof and which also includes spirally disposed cords for improving the burst strength of the tube.

Further objects and advantages of the present invention will be apparent from the following description, reference being had to the accompanying drawing, wherein a preferred embodiment of the present invention is clearly shown.

Tubing of the character described herein may be made by the method disclosed in copending application, Serial No. 242,362, filed concurrently herewith. The tubing as described herein is also quite similar to the flexible tubing disclosed in our copending application, Serial No. 242,355, also filed concurrently herewith.

In Serial No. 242,362, a method is disclosed for extruding long lengths of ribbon from rubber-like, elastomeric material wherein a reinforcing wire is formed into a preset curvature and is passed through an extruding die so that the rubber-like material is covered thereover. This elastomeric and reinforced ribbon is then overlapped and wound helically upon a mandrel into a continuous tube and is cured or vulcanized for integrating the overlapped rubber-like tape or ribbon to form a unitary or tubular structure. The reinforcing wire also runs helically through the tube for supporting the same and preventing collapse thereof during flexing or bending. The invention here is directed to tubing made by the method described in said application and is specifically different than the tubing described in our copending application, Serial No. 242,355, in that cords are incorporated in the rubber-like ribbon in addition to the reinforcing wire. Specifically, tubing of this character is used for fluid carrying purposes wherein the fluid passes therethrough under considerable pressure, for example, in an automotive cooling system and the like. The use of the wire alone, while preventing collapse of the tube, does not provide sufficient burst strength between the adjacent turns of the wire to permit the tube to carry fluids under any great pressure, therefore, the tubing described herein is strengthened from the burst angle so that the tube may carry fluids under appreciable pressures.

Figure 1:
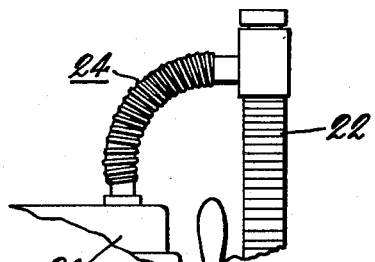
Fig. 1 is a fragmentary view showing an adaptation of the tubing disclosed herein as applied to an automotive cooling system.
Figure 2:
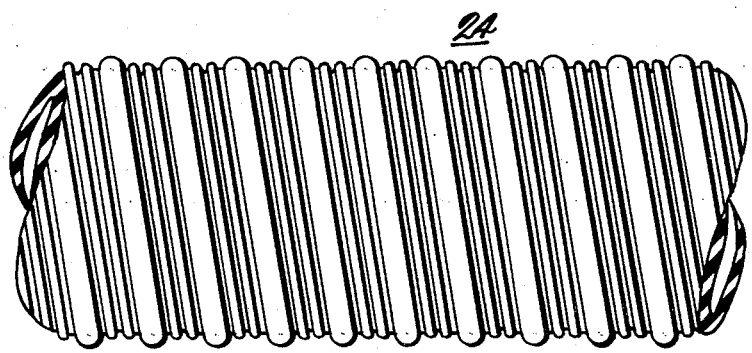
Fig. 2 is a side view of a section of the tubing.
Figure 3:
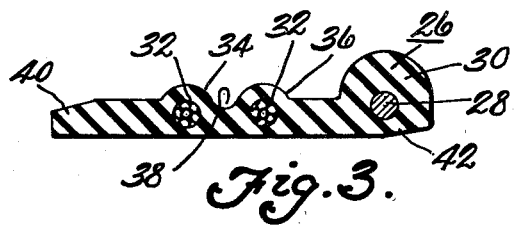
Fig. 3 is a view in section of the reinforced ribbon used to fabricate the tubing.
Figure 4:
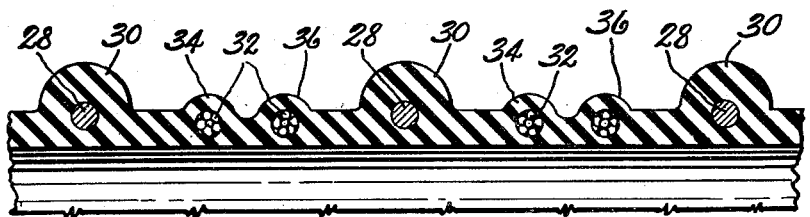
Fig. 4 is a fragmentary view of a section taken through the wall of the tubing, showing portions of three turns of the ribbon in integrated form.

Referring specifically to the drawings, Fig. 1 shows a section of an automotive engine 20 and a radiator 22 which is connected by a length of tubing 24. The tubing 24 is shown in more detail in Fig. 2 wherein the helical disposition of the ribbon-like tape 26 is clearly shown. A cross section of this ribbon-like tape 26 is shown in Fig. 3 wherein a wire 28 is included in an increased thickness portion 30 thereof and two cords 32 are included in spaced longitudinally, disposed ridges 34 and 36 thereof. The ridges 34 and 36 act as boundaries for a valley or depressed section 38 which runs longitudinally therebetween wherein the thickness at the base of the valley 38 is less than the thickness of any other portion of the ribbon. Opposite ends of the ribbon are tapered slightly at 40 and 42 so that when the ribbon 26 is wrapped spirally with a slight overlap, the tapered sections 40 and 42 form a smooth joint therebetween. The cords 32 are included in the ribbon in the same manner that the wire 28 is included, namely, during the extrusion of the ribbon through the extruder die.

Cords 32 are used in place of additional wires due to the expense and rigidity of the wire. The wire used at 28 is a spring wire variety which is relatively costly compared to a cord made from any suitable material and since the cords 32 are used merely to strengthen the tube 24 against internal bursting pressures deforming the tube in any way, this is more desirable than wire or the like and present a less expensive and more flexible tube. The cords 32 are preferably of a multistrand variety for increased strength, although single strand cords may be used, this being a matter of choice, dependent upon the burst strength desired in the hose or tube. The material of the cords is also a matter of choice and may be any of the usual natural cord and rope materials or one or more of the synthetic materials.

After the ribbon 26 is extruded from a die with the cords and wire therein, it is spirally wrapped on a mandrel and cured as disclosed in the aforementioned application to form an integral tube.

The valley 38, between the ridges 34 and 36, forms a spirally weakened portion along the tube which permits easy flexing of the tube. The thickness of the material in the valley 38 should be sufficient to withstand the fluid pressures carried by the tube and this may be regulated by using extrusion dies in the manufacture of the ribbon which will give the necessary strength to the ribbon.

A tube of this design not only is readily flexible without buckling even when bent into 90° form, but it likewise has good burst strength and, therefore, is highly suitable for carrying fluids under pressure.

While the embodiment of the present invention as herein disclosed, constitutes a preferred form, it is to be understood that other forms might be adopted.

What is claimed is as follows:

1. In a flexible elastomeric tube made from spirally wrapped elastomeric tape, the combination comprising; at least three spirally disposed continuously extending rib enlargements wherein one of said ribs is larger than the remainder, a spirally disposed reinforcing member embedded in said one rib for strengthening said tube against inward collapse, said other ribs being equally spaced between adjacent turns of said one rib and spaced adjacent one another, a valley portion between said ribs having a depth sufficient to form a spirally weakened portion in the tube wall, said valley portion being adapted to improve the bandability of said tube without substantial buckling, and nonmetallic cords embedded in each of the other of said ribs, said cords being completely covered by the elastomeric material of said other ribs for strengthening the tube against outward bursting due to internal pressure.

2. In a flexible elastomeric tube made from spirally wrapped elastomeric tape, the combination comprising; a spirally disposed continuously extending rib enlargement, a wire reinforcing member embedded within said enlargement, the spiral of said wire reinforcing member normally having a free diameter greater than the diameter of said tube for strengthening said tube against inward collapse, a second spirally disposed rib enlargement laterally spaced from and a smaller size than said first enlargement, and a nonmetallic cord embedded in said second enlargement for strengthening the tube against outward bursting due to internal pressure.

3. In a flexible elastomeric tube made from a spirally wrapped elastomeric tape, the combination; at least three spirally disposed continuously extending rib enlargements wherein one of said ribs is larger than the remainder, a spirally disposed reinforcing member embedded in said one rib for strengthening said tube against inward collapse, said other ribs being equally spaced between adjacent turns of said one rib and spaced adjacent one another, a valley portion between said ribs having a depth sufficient to form a spirally weakened portion in the tube wall wherein the thickness of the tube wall at said spirally weakened portion is less than the thickness of other portions of said tube wall, said valley portion being adapted to improve the bendability of said tube without substantial buckling, and nonmetallic cords embedded in each of the other ribs, said cords being completely covered by the elastomeric material of said other ribs for strengthening the tube against outward bursting due to internal pressure.

References Cited in the file of this patent
UNITED STATES PATENTS

| | | |
|---|---|---|
| 375,877 | Judson | Jan. 3, 1888 |
| 2,406,838 | Kepler | Sept. 3, 1946 |
| 2,448,485 | Chernack | Aug. 31, 1948 |
| 2,452,047 | Hamblin | Oct. 26, 1948 |
| 2,524,522 | Gilmore et al. | Oct. 3, 1950 |
| 2,570,259 | McKinley | Oct. 9, 1951 |
| 2,622,623 | Michaudet | Dec. 23, 1952 |

FOREIGN PATENTS

| | | |
|---|---|---|
| 846,632 | France | Sept. 21, 1939 |